United States Patent

Trevillyan et al.

[15] 3,670,003

[45] June 13, 1972

[54] PREPARATION OF PHENYLENE DIISOCYANATE BY THERMAL DECOMPOSITION OF CORRESPONDING DINITRILE SULFITE

[72] Inventors: Alvin E. Trevillyan, Glenwood; Ivars Vecbastiks, Park Forest, both of Ill.

[73] Assignee: Atlantic Richfield Company, New York, N.Y.

[22] Filed: June 12, 1969

[21] Appl. No.: 832,857

[52] U.S. Cl. .......................................................260/453 P
[51] Int. Cl. .......................................................C07c 119/04
[58] Field of Search ................................260/453 P, 453 SP

[56] References Cited

UNITED STATES PATENTS

| | | | |
|---|---|---|---|
| 3,423,450 | 1/1969 | Burk, Jr. et al. | 260/453 |
| 3,211,631 | 10/1965 | Fuchs | 260/453 X |
| 3,144,474 | 8/1964 | Kantyka et al. | 260/453 |

Primary Examiner—Joseph Rebold
Assistant Examiner—Dolph H. Torrence
Attorney—McLean, Morton and Boustead

[57] ABSTRACT

A solvent system employed in the preparation of phenylene diisocyanates in high yields and purity from phenylene di(nitrile sulfites) wherein the nitrile sulfite groups are either meta or para to each other, is disclosed. The solvents employed are paraffinic hydrocarbons often having about 4 to 16 carbon atoms. Solvent recycle is advantageously employed in the decomposition of, for instance, benzene-1,4-di(nitrile) sulfite) to improve product yield without decreasing purity.

16 Claims, No Drawings

PREPARATION OF PHENYLENE DIISOCYANATE BY THERMAL DECOMPOSITION OF CORRESPONDING DINITRILE SULFITE

The present invention relates to a solvent system employed in the preparation of isocyanates. More particularly, the invention relates to a solvent system employed in the decomposition of phenylene di(nitrile sulfites), e.g. benzene-1,3-di(nitrile sulfite), and the production of the corresponding phenylene diisocyanates.

Polyisocyanates such as diisocyanates have found extensive use in the preparation of high molecular weight polymers by reaction of the polyisocyanates with polymerizable organic compounds such as compounds with terminal, active hydroxy or amine groups. Polyurethanes, for example, are commonly prepared by the reaction of diisocyanates and polyhydroxy alcohols such as the glycols.

Decomposition of aromatic polynitrile sulfites to the corresponding aromatic polyisocyanates is known in the art. This process has been described, for example, in U.S. Pat. No. 3,268,542 to Burk and Carlos. The solvent employed in this process has typically been an aromatic solvent such as chlorobenzene or toluene. Such solvents serve as heat sinks to carry off the heat of the exothermic decomposition. While the reaction proceeds smoothly in these aromatic solvents, the product diisocyanates are relatively soluble in such solvents and recovery of the product involves complete solvent removal, which can be commercially unattractive due to the added cost of solvent distillation. In addition, significant amounts of impurities are isolated with the product, thus compounding the problem of product purification.

It has now been found, however, that the above disadvantages can be overcome by employing a paraffinic solvent in the preparation of phenylene diisocyanates from the corresponding phenylene di(nitrile sulfites). Although the phenylene di(nitrile sulfites) are virtually insoluble in these paraffinic solvents, the latter provide a good dispersing and heat transfer medium, giving a smooth decomposition. The phenylene diisocyanates are soluble in the hot mixture which results at the completion of the reaction, while undissolved solids such as by-product polymers and other impurities are insoluble and may be removed by filtration or other suitable means of separation at the elevated temperatures. The phenylene diisocyanate product can then be crystallized by cooling and may be recovered from its mother liquor by conventional techniques while the solvent may be recycled to be used again.

Since the phenylene diisocyanate can be crystallized directly from the paraffin solvent, the filtrate may be recycled to the decomposition step, eliminating the necessity of total solvent distillation. While this represents a significant improvement in product recovery, it does create the possibility of impurity build-up in the recycle stream such that the purity of the crystallized product could be affected. To investigate this aspect of the process, a solvent recycle study was made to determine the effect of solvent recycle on the purity of the product of benzene-1,4-di(nitrile sulfite) decomposition. The study consisted of several decomposition runs in n-octane solvent at varying solvent-to-solids ratios and solvent recycle rates. In each run the reaction mixture was heated until the exothermic decomposition reaction took hold, usually at about 95° C. The reaction was continued for about 1½ to 2 hours, with the temperature gradually rising to the boiling point of the solvent. The last 15 minutes, approximately, of each run was at the reflux temperatures. The results of the study are summarized in Table I.

From an examination of Table I, it is apparent that product yield is increased by solvent recycle. Also, solvent recycle does not appear to reduce product purity. Paraphenylene diisocyanate purity consistently analyzed over 96 percent, usually close to 98 percent, by sublimation, which is considered more indicative of recoverable, pure product than the titration method. With few exceptions, sulfur impurities analyzed consistently below 0.05 percent (lower limit of analysis method) and chlorine impurities analyzed in the range of 0.1 to 0.2 percent.

The method of this invention involves decomposing a phenylene di(nitrile sulfite) while in admixture with a paraffinic hydrocarbon such as n-octane. If the particular phenylene di(nitrile sulfite) melts at a temperature below its decomposition temperature in the reaction mixture, as occurs in the decomposition of benzene-1,3-di(nitrile sulfite) in a paraffinic solvent, it is advantageous to conduct the decomposition in particular ways. Thus, liquid particles of the di(nitrile sulfite) may agglomerate and provide only a minimum of contact area with the solvent medium. When this occurs there is very little heat transfer to the solvent and the resulting product is of poorer quality and is obtained in lower yields. To avoid these difficulties, techniques can be employed which will improve yield and quality. One such technique involves the gradual addition of the phenylene di(nitrile sulfite) to the hot solvent maintained at a temperature which will provide reasonably rapid decomposition. By this method, decomposition is achieved very rapidly and agglomeration of the molten di(nitrile sulfite) is avoided. A second technique involves the addition of an appropriate amount of an inert solid to the reaction mixture. This solid material provides a surface which absorbs the tar-like by-products of the thermal decomposition which are often obtained in small quantities and which adhere to the sides of the reaction vessel. These tar-like materials are undesirable in commercial operations since such an accumulation on the vessel changes heat transfer properties and necessitates periodic cleaning.

The inert solid can be any finely-divided, solid material which is insoluble in the reaction solvent and which has a surface area in excess of one square meter per gram. By "inert" is meant does not react with the di(nitrile sulfite) or the isocyanate product. Suitable solids include silica and other refractory materials such as diatomaceous earth, silica-alumina, alumina, etc. This inert solid is employed in amounts sufficient to improve product yield, e.g. about 0.1 to 50, preferably about 1 to 15, weight percent, based on the weight of the di(nitrile sulfite). The solid material may be added to the cold mixture of di(nitrile sulfite) and solvent prior to heating. Alternatively, the solid material may be added to the solvent which is then heated prior to addition of the di(nitrile sulfite), or the solid may be mixed with the di(nitrile sulfite) prior to addition to the hot solvent.

The phenylene di(nitrile sulfites) which are subjected to decomposition by the process of this invention are those wherein the cyclic nitrile sulfite groups

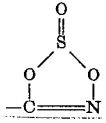

have meta or para positions to each other on the benzene ring. The benzene ring can also have substituents which do not unduly interfere with the desired reaction. These phenylene

TABLE I.—BENZENE-1,4-DI(NITRILE SULFITE) DECOMPOSITION

| BDNS [1] | Solvent vol., cc. | | Product yield, percent | Purity of product [2] | | | |
|---|---|---|---|---|---|---|---|
| | Total | Recycle | | Sublimation [3] | Titration [4] | Percent Cl | Percent S |
| 28.8 | 410 | None | 30.1 | 92 | 95.5 | 0.33 | 0.13 |
| 28.8 | 465 | 465 | 109.4 | 98 | 100.5 | 0.14 | 0.43 |
| 195 | 1500 | None | 66.0 | 98 | 97.1 | <0.05 | 0.06 |
| 223 | 1500 | 1,400 | 86.4 | 97 | 96.2 | 0.15 | <0.05 |
| 222 | 1500 | 1,340 | 87.4 | 97.6 | 95.9 | 0.09 | <0.05 |
| 310 | 1500 | None | 84.1 | | 97.5 | 0.28 | <0.05 |
| 322 | 1500 | 1,500 | 92.2 | | 98.8 | 0.12 | <0.05 |

[1] Weight amount of benzene-1,4-di(nitrile sulfite) in grams.
[2] Para-phenylene diisocyanate.
[3] Analysis by sublimation, percent.
[4] Analysis by titration, percent.

di(nitrile sulfites) can be prepared by any known process, for example by the reaction of the corresponding phenylene dihydroxamic acid and thionyl chloride. This reaction is described in U. S. Pat. No. 3,268,542 to Burk and Carlos.

The solvent is present in the decomposition admixture in an amount sufficient to dissolve diisocyanate produced by the decomposition, preferably substantially all of the diisocyanate product for maximum yield. Often, this will constitute about 20 to 95 percent, preferably about 60 to 90 percent, of the weight of the decomposition admixture. The phenylene di(nitrile sulfite) will generally constitute about 5 to 80 weight percent, preferably about 10 to 40 weight percent, of the decomposition admixture.

Decomposition temperatures employed in this invention may range from about 30° to 200° C. with a preferred range being about 50° to 165° C. The decomposition is usually run at atmospheric pressure, but higher pressures may be employed to achieve decomposition, especially in a low boiling solvent. With higher boiling solvents, satisfactory temperatures may be obtained with refluxing.

The solvent employed in the thermal decomposition can be those inert solvents which will dissolve the product diisocyanate when the solvent has been heated to a temperature in the range of about 30° to 200° C. but will not dissolve by-product polymer. The solvent must also precipitate the product diisocyanate upon cooling. For the purposes of this invention an inert solvent is one which is thermally stable at reaction temperatures, has no active hydrogen sites and will not react with the di(nitrile sulfite) feed or the diisocyanate product. Paraffin solvents have been found to be particularly well suited for these reactions. Paraffinic hydrocarbons having about four to 16, preferably about four to 12, carbon atoms can be employed. Suitable paraffin solvents thus include n-pentane, n-hexane and n-octane, for example, and these paraffin solvents may be employed separately or as mixtures. The solvent should exist as a liquid at the reaction conditions employed. Elevated pressures can be used to maintain the lighter solvents in a liquid state.

In carrying out the decomposition by the process of this invention, the solid di(nitrile sulfite) may be mixed with cold solvent and the mixture heated to the decomposition temperature or, alternatively, the solvent may be heated and the di(nitrile sulfite) gradually added to the solvent. The product diisocyanate can be obtained by cooling the solution sufficiently below the decomposition temperature to obtain the product as a precipitate. It may be necessary to cool below ambient temperature in order to accomplish this precipitation.

The following examples are illustrative of this invention.

EXAMPLE I

Benzene-1,4-di(nitrile sulfite) in the amount of 223 g. (0.75 mole) was mixed with 1500 cc. of n-octane (1400 cc. of which was recycled) in a three-liter flask fitted with stirrer, condenser and thermowell. The mixture was then heated and the reaction commenced at a temperature of about 95° C., as evidenced by the evolution of sulfur dioxide. The reaction continued for about one hour, after which no further evolution of sulfur dioxide was observed, the temperature of the mixture at this time being about 125° C. The mixture was filtered hot and the filtrate allowed to cool. The resulting crystalline material was then filtered, washed with fresh n-octane and dried. The yield of p-phenylene diisocyanate obtained was 120 g., representing 86.4 weight percent of the theoretical yield, based on the nitrile sulfite starting material. Table II lists the results of this as well as additional examples of benzene-1,4-di(nitrile sulfite) decomposition employing solvent recycle.

TABLE II.—BENZENE-1,4-DI(NITRILE SULFITE) DECOMPOSITION

| Run | Solvent | Concentration,[1] wt. percent | Yield wt. percent | Purity, wt. percent |
| --- | --- | --- | --- | --- |
| 1 | Toluene[2] | | 81 | [3] 96 |
| 2 | n-Octane | 21.3 | 86.4 | 97 |
| 3 | do | 21.2 | 87.4 | 97.6 |
| 4 | do | 19.0 | 89.1 | 96.8 |
| 5 | do.[2] | 29.6 | 84.1 | [4] 97.5 |
| 6 | do | 30.7 | 92.2 | 98.8 |
| 7 | do | 29.3 | 90.7 | 97.6 |

[1] Weight percent benzene-1,4-di(nitrile sulfite) in solvent.
[2] No solvent recycle employed. All others employed 85–100% solvent recycle.
[3] Runs 1–4 were determined by sublimation.
[4] Runs 5–7 were determined by titration.

EXAMPLE II

Into a 500 cc. fluted flask fitted with a stirrer, reflux condenser and solids feeding device was placed 200 cc. of n-octane. This solvent was heated to reflux (about 125° C.) with stirring. To the solvent was added a mixture comprising 30 g. (0.1 mole) benzene-1,3-di(nitrile sulfite) and an appropriate amount (see Table III) of "Supercel," a commercially available, finely-divided, inert, solid silica material, over a period of one hour. The mixture was stirred hot for an additional 30 minutes and then filtered at reaction temperature. The inert solid was washed and dried, and the weight change noted. The filtrate was allowed to cool and the crystalline material isolated by filtration followed by washing and drying. No solvent recycle was employed in this example. In each case the filtrate was evaporated to dryness to recover the portion of product, meta-phenylene diisocyanate, dissolved. Yields were calculated on the basis of total product, both crystallized and dissolved. Table III lists the results of this as well as additional examples of benzene-1,3-di(nitrile sulfite) decomposition without recycle.

TABLE III.—BENZENE-1,3-DI(NITRILE SULFITE) DECOMPOSITION

| | Inert solid concentration,[1] wt. percent | Product | | |
| --- | --- | --- | --- | --- |
| Solvent | | Yield, wt. percent | Purity,[2] wt. percent | Wt. by-product, g. |
| 1. Toluene | | 98 | 94.5 | |
| 2. n-Octane | | 94.5 | | [3] 1.2 |
| 3. do | 2.5 | 96.5 | | 1.2 |
| 4. do | 5.0 | 96.0 | 96.6 | 0.9 |
| 5. do | 10.0 | 95.5 | | 0.9 |
| 6. do | 18.5 | 60 | | 6.0 |

[1] The inert solid was "Supercel." The concentration is in percent, based on weight of nitrile sulfite.
[2] Purity determined by distillation.
[3] By-product obtained on wall of reaction vessel. In remaining tests the weight represents weight gain "Supercel."

We claim:

1. In a process of preparing phenylene diisocyanate comprising heating phenylene di(nitrile sulfite) whose nitrile sulfite groups are either meta or para to each other so as to decompose the di(nitrile sulfite) to the corresponding phenylene diisocyanate and subjecting the resulting product mixture to a separation step to remove insoluble by-products from the diisocyanate solution, the improvement comprising conducting said heating of the di(nitrile sulfite) while the latter is in admixture with an amount of liquid, paraffinic hydrocarbon having about 4 to 16 carbon atoms sufficient to dissolve diisocyanate produced by the decomposition.

2. The improvement of claim 1 wherein the separated diisocyanate solution is cooled to cause the diisocyanate to crystallize out of the solution, and the resulting crystallized diisocyanate is separated from its mother liquor.

3. The improvement of claim 2 wherein the decomposition is effected at a temperature in the range of about 30° to 200° C.

4. The improvement of claim 2 wherein the phenylene di(nitrile sulfite) subjected to decomposition is benzene-1,4-di(nitrile sulfite) and the phenylene diisocyanate produced thereby is para-phenylene diisocyanate.

5. The improvement of claim 4 wherein the hydrocarbon employed is n-octane.

6. The improvement of claim 4 wherein the mother liquor is recycled to the decomposition step following the separation therefrom of the para-phenylene diisocyanate.

7. The improvement of claim 2 wherein the phenylene di(nitrile sulfite) subjected to decomposition is benzene-1,3-di(nitrile sulfite) and the phenylene diisocyanate produced thereby is meta-phenylene diisocyanate.

8. The improvement of claim 7 wherein the hydrocarbon employed is n-octane.

9. The improvement of claim 7 wherein a finely-divided, inert, solid material which is insoluble in the hydrocarbon and which has a surface area in excess of one square meter per gram is included in the decomposition admixture.

10. The improvement of claim 9 wherein the amount of the solid material which is included in the decomposition admixture is about 0.1 to 50 percent, based on the weight of the di(nitrile sulfite), and the amount of hydrocarbon present in the decomposition admixture is about 20 to 95 percent, based on the weight of the admixture.

11. In a process of preparing meta-phenylene diisocyanate comprising heating benzene-1,3-di(nitrile sulfite) to a temperature of about 50° to 165° C. to decompose the di(nitrile sulfite) to meta-phenylene diisocyanate, subjecting the resulting product mixture to a separation step to remove insoluble by-products from the diisocyanate solution, cooling the separated diisocyanate solution to cause the diisocyanate to crystallize out of solution and thereafter recovering the crystallized diisocyanate from its mother liquor, the improvement comprising conducting said heating of the di(nitrile sulfite) while the latter is in admixture with a liquid, paraffinic hydrocarbon having about 4 to 12 carbon atoms and a finely-divided, inert, solid, refractory material which is insoluble in the hydrocarbon and which has a surface area in excess of one square meter per gram, the amount of said hydrocarbon in the admixture being about 60 to 90 percent, based on the weight of the admixture, and said refractory material being present in the admixture in an amount within the range of about 1 to 15 percent; based on the weight of the di(nitrile sulfite).

12. The improvement of claim 11 wherein the hydrocarbon is n-octane and the refractory material is silica.

13. The improvement of claim 12 wherein the mother liquor is recycled to the decomposition step following the separation therefrom of the meta-phenylene diisocyanate.

14. In a process of preparing para-phenylene diisocyanate comprising heating benzene-1,4-di(nitrile sulfite) to a temperature of about 50° to 165° C. to decompose the di(nitrile sulfite) to para-phenylene diisocyanate, subjecting the resulting product mixture to a separation step to remove insoluble by-products from the diisocyanate solution, cooling the separated diisocyanate solution to cause the diisocyanate to crystallize out of the solution and thereafter recovering the crystallized diisocyanate from its mother liquor, the improvement comprising conducting said heating of the di(nitrile sulfite) while the latter is in admixture with about 60 to 90 percent, based on the weight of the admixture of a liquid, paraffinic hydrocarbon having about four to 12 carbon atoms.

15. The improvement of claim 14 wherein the mother liquor is recycled to the decomposition step following the separation therefrom of the para-phenylene diisocyanate.

16. The improvement of claim 1 wherein said paraffinic hydrocarbon has from about four to 12 carbon atoms.

* * * * *